United States Patent
Nowak

[19]

[11] Patent Number: 5,813,323
[45] Date of Patent: Sep. 29, 1998

[54] MULTIPLE-BIN WASTE COMPACTOR

[76] Inventor: Esther C. Nowak, P.O. Box 876, Eagle River, Wis. 54521

[21] Appl. No.: 925,042

[22] Filed: Sep. 8, 1997

[51] Int. Cl.⁶ .............................. B30B 15/00; B30B 9/30
[52] U.S. Cl. ............................. 100/52; 100/99; 100/223
[58] Field of Search ................... 100/50, 52, 99, 100/221, 223, 229 A

[56] References Cited

U.S. PATENT DOCUMENTS

| | | | |
|---|---|---|---|
| 3,831,513 | 8/1974 | Tashman | 100/52 |
| 3,916,782 | 11/1975 | Booton | 100/50 |
| 4,735,136 | 4/1988 | Lee et al. | 100/52 |
| 5,123,341 | 6/1992 | Carter et al. | 100/223 |
| 5,129,318 | 7/1992 | Zimmer . | |
| 5,172,630 | 12/1992 | Thompson | 100/223 |
| 5,243,903 | 9/1993 | Blackmer et al. . | |
| 5,255,982 | 10/1993 | Zimmer . | |
| 5,257,577 | 11/1993 | Clark | 100/223 |
| 5,259,304 | 11/1993 | Roberts | 100/223 |
| 5,333,542 | 8/1994 | Lewis et al. . | |
| 5,415,086 | 5/1995 | Robbins . | |

*Primary Examiner*—Stephen F. Gerrity
*Attorney, Agent, or Firm*—David L. Volk

[57] ABSTRACT

A plurality of bins are configured to be removably positioned on a platform within a housing. A first opening in the housing is positioned above the bins. A second opening in the housing is configured to permit the bins to be removed there-through. The platform is configured to rotate a selected one of the bins into position adjacent the first opening and the second opening simultaneously, such that waste can be transferred through the first opening into the selected one of the bins, and such that the selected one of the bins can be removed through the second opening. The platform is further configured to rotate a chosen one of the bins into position adjacent a compacting apparatus such that the compacting apparatus can compact waste within the chosen one of the bins. When travel of an arm of the compacting apparatus into the bin is less than a pre-determined distance, an indicator indicates that the bin is full.

5 Claims, 3 Drawing Sheets

MULTIPLE-BIN WASTE COMPACTOR

BACKGROUND OF THE INVENTION

1. Field of the Invention

The present invention relates to waste compactors, particularly those with multiple bins.

2. Description of the Related Art

Recycling is a major factor in proper stewardship of the environment. Many municipalities today require that waste be separated and recycled. Compliance with this requirement can be time consuming and space consuming as well.

What is needed is a device that makes separation of waste for recycling easy and convenient, and which compacts the waste to save space.

SUMMARY OF THE INVENTION

The waste compactor of the present invention includes a housing, and a plurality of bins configured to be removably positioned on a platform within the housing. A first opening in the housing is positioned above the bins. A second opening in the housing is configured to permit the bins to be removed there-through. The platform is configured to rotate a selected one of the bins into position adjacent the first opening and the second opening simultaneously, such that waste can be transferred through the first opening into the selected one of the bins, and such that the selected one of the bins can be removed through the second opening. The platform is further configured to rotate a chosen one of the bins into position adjacent a compacting apparatus such that the compacting apparatus can compact waste within the chosen one of the bins. When travel of an arm of the compacting apparatus into the bin is less than a pre-determined distance, an indicator indicates that the bin is full.

Because a plurality of bins are removably positionable on a rotating platform within a housing, a variety of recyclables can be transferred into, and compacted within separate bins, within a single, convenient, space-saving housing.

Because the bins are selectively, automatically positionable adjacent the first and second openings and adjacent the compacting apparatus, the device of the present invention is convenient and time saving.

Still further features and advantages will become apparent from the ensuing description and drawings.

DETAILED DESCRIPTION

Figure 1:
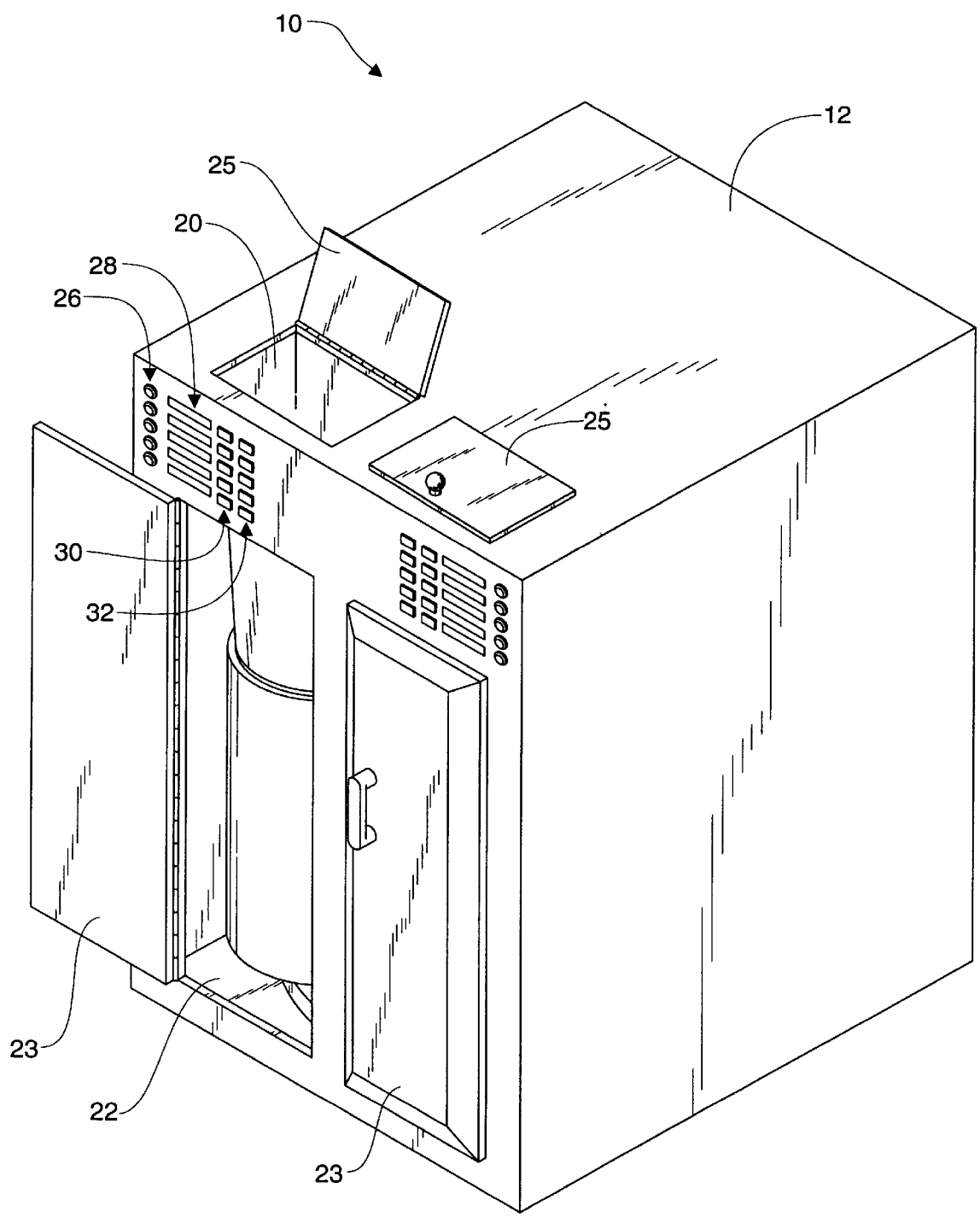
FIG. 1 is a perspective view of a waste compactor of the present invention.

FIG. 1 is a perspective view of a waste compactor 10 of the present invention. The waste compactor 10 includes a housing 12, which is configured and styled to fit attractively in a kitchen setting alongside standard cabinetry.

Figure 2:
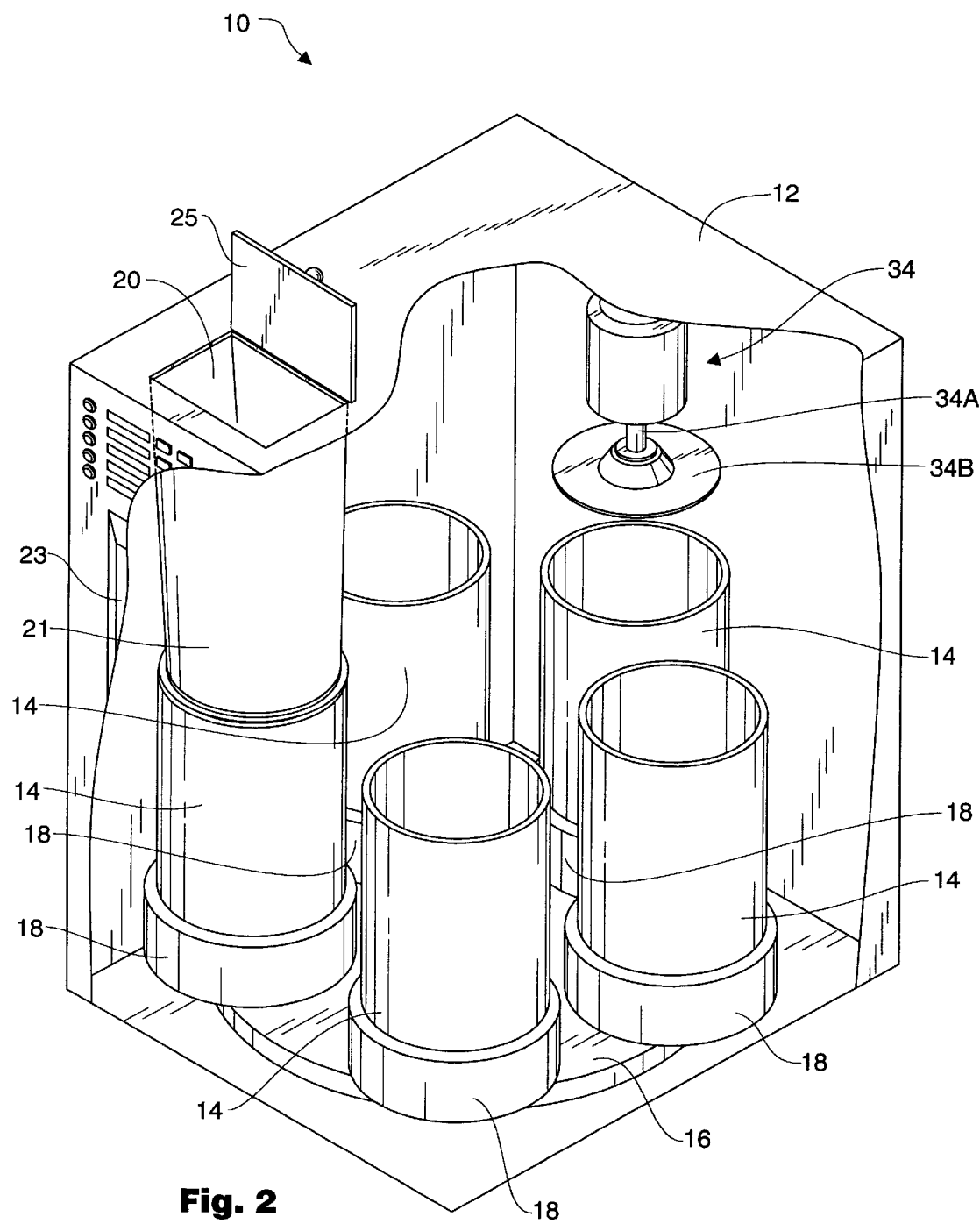
FIG. 2 is a cut-away perspective view of the waste compactor, showing the interior components thereof.

FIG. 2 is a cut-away perspective view of the waste compactor 10, showing the interior components thereof. Referring to FIGS. 1–2, the waste compactor 10 includes a housing 12, and a platform 16 within the housing. The platform 16 includes a plurality of sleeves 18 distributed in a generally circular pattern about a perimeter of the platform 16. Bins 14 are removably insertable within the sleeves 18.

Two first openings 20 in the housing 12 are positioned above the bins 14. The first openings 20 each include a hinged lid 25 thereon. Although two first openings 20 are shown, the present invention could be implemented with one or any suitable number of first openings 20.

Two second openings 22 in the housing 12 are configured to permit the bins 14 to be removed there-through. The second openings 22 each include a hinged door 23 thereon. Although two second openings 22 are shown, the present invention could be implemented with one or any suitable number of second openings 22.

Figure 3:
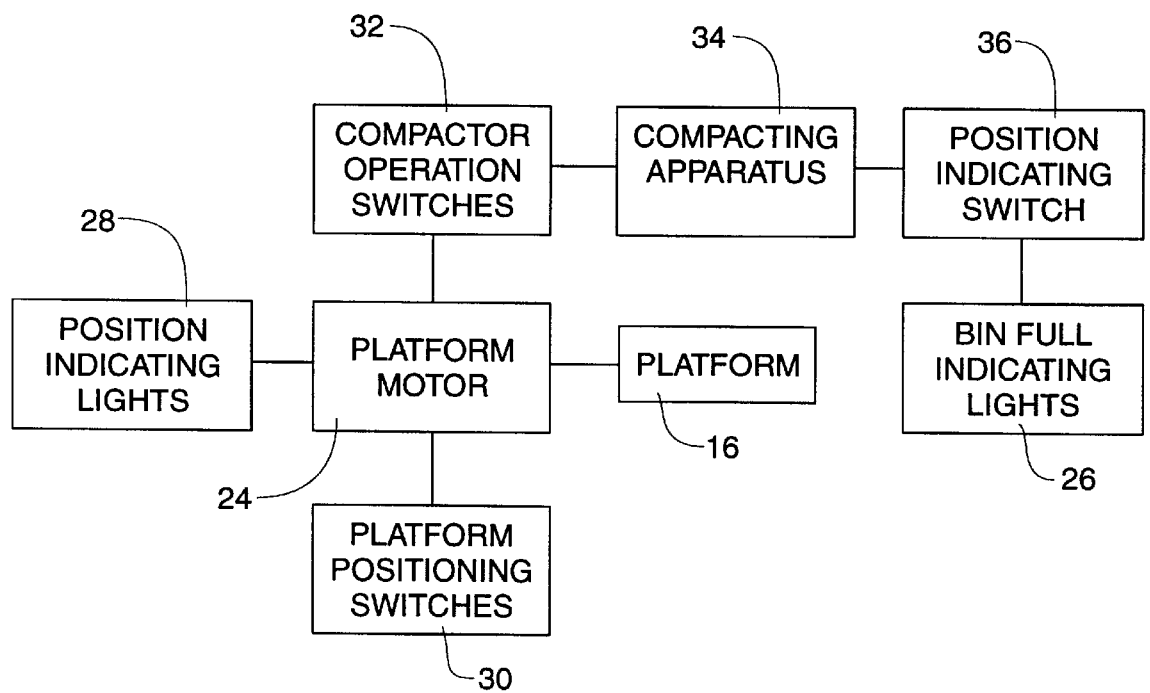
FIG. 3 is a block schematic diagram of the waste compactor.

FIG. 3 is a block schematic diagram of the waste compactor 10. Referring to all of the figures, position indicating lights 28 are located on the front of the housing 12 beneath each of the first openings 20. Each position indicating light 28 is preferably labeled to indicate a particular bin 14. The labels would indicate the type of waste which is intended for the particular bin 14, such as "PAPER," "GLASS," "ALUMINUM" and the like.

In line with each position indicating light 28 is a platform positioning switch 30, a bin full indicating light 26, and a compactor operation switch 32. Each of the components 26, 28, 30, 32 in a given horizontal row are associated with the bin 14 which is designated by the label on the position indicating light 28 in that particular row. Each group of components 26, 28, 30, 32 is associated with the first and second openings 20, 22 which are adjacent thereto.

The platform 16 is rotated by a platform motor 24. The platform positioning switches 26 may be selectively pressed to cause the platform motor 24 to rotate the platform 16 to move a selected one of the bins 14 into position beneath the first opening 20 and adjacent the second opening 22, such that waste (not shown) can be transferred through the first opening 20, through a chute 21, and into the selected one of the bins 14, and such that the selected one of the bins 14 can be removed through the second opening 22. When the platform 16 stops rotating and the bins 14 are in the selected positions, the appropriate position indicating light 28 adjacent each first opening 20 will light to indicate which bin 14 is beneath the first opening 20.

A compacting apparatus 34 is located to the rear of the housing 12 above the bins 14. An arm 34A of the compacting apparatus 34 includes a plate 34B at a distal end thereof. When a selected one of the compactor operation switches 32 is pressed, the bin 14 which is associated with the compactor operation switch 32 rotates on the platform 16 to a position beneath the compacting apparatus 34. The arm 34A of the compacting apparatus 34 then travels downward in a conventional manner to urge the plate 34B against the waste within the bin 14 to compact the waste.

A position indicating switch 36 (shown in FIG. 3) is located on the compacting apparatus 34, and is configured to trip when the arm 34A has traveled a pre-determined distance. The arm 34A is configured in a known manner to return upward after a pre-determined degree of resistance is encountered on the downward movement. When the arm 34A travels downward, and then returns, but the position indicating switch 36 is not tripped, this indicates that the bin 14 is full, and the bin full indicating light 26 will illuminate.

As an example of how the present invention may be used, assume a user (not shown) wishes to place a used plastic milk bottle (not shown) in the appropriate bin 14. He or she checks the position indicating lights 28 to see whether the bin 14 for paper is already beneath one of the first openings 20. If such is the case, the user may open the appropriate lid 25 and place the bottle into the bin 14 through the first opening 20 and the chute 21.

If the appropriate bin 14 is not beneath one of the first openings 20, the user may press the platform positioning switch 30 which is in the same row as the position indicating light 28 which is labeled "PAPER." This will cause the platform 16 to rotate to position the bin 14 for paper beneath the first opening 20 which is adjacent the platform positioning switch 30 which was pressed. Assuming the user wanted the bin 14 for paper to be positioned beneath the right hand first opening 20, he or she would have pressed the platform positioning switch 30 which is adjacent the right hand first opening 20.

If the user wishes to compact the paper within the bin 14, he or she presses the appropriate compactor operation switch 32, which causes the bin 14 containing paper to rotate to a position beneath the compacting apparatus 34, and the arm 34A to move downward, urging the plate 34B against the waste. If the position indicating switch 36 is not tripped after the arm 34A has stopped moving downward, this indicates that the bin 14 is full, and the appropriate bin full indicating light 26 illuminates.

The user may then wish to press the appropriate platform positioning switch 30 to rotate the bin 14 containing paper into position adjacent one of the second openings 22, for removal of the bin 14 through the second opening 22. The user can then empty the bin 14 and re-insert the bin 14 for continued use.

The electrical and electronic circuitry and mechanical structure required to implement the present invention would be easily determined from one skilled in the art without undue experimentation, based on the disclosure provided herein.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A waste compactor comprising:
   a. a housing;
   b. a rotating means;
   c. a plurality of bins configured to be removably positioned on the rotating means;
   d. the housing having structure forming a plurality of first openings therein, the first openings positioned substantially above the bins when the waste compactor is ready is for use;
   e. the housing having structure forming a plurality of second openings therein, the second openings configured to permit the bins to be removed there-through;
   f. each of the second openings being beneath a corresponding one of the first openings:
   g. the rotating means configured to rotate a selected one of the bins into position adjacent a selected one of the first openings and a corresponding one of the second openings simultaneously, such that waste can be transferred through the selected one of the first openings into the selected one of the bins, and such that the selected one of the bins can be removed through the second opening corresponding to the selected one of the first openings;
   h. a compacting means adapted to compact waste within the bins; and
   i. the rotating means further configured to rotate a chosen one of the bins into position adjacent the compacting means such that the compacting means can compact waste within the chosen one of the bins.

2. The waste compactor of claim 1, further comprising a sensing and indicating means configured to indicate that one of the bins is full when travel of an arm of the compactor into the bin is less than a pre-determined distance, as sensed by the sensing and indicating means.

3. The waste compactor of claim 1, further comprising:
   a. a plurality of sets of position indicating lights;
   b. each of the sets of position indicating lights corresponding to a different pair of corresponding first and second openings;
   c. each of the position indicating lights within each of the sets corresponding to a different one of the bins; and
   d. each of the position indicating lights configured to illuminate when a corresponding one of the bins is beneath a corresponding one of the first openings.

4. The waste compactor of claim 3, further comprising a platform positioning switch corresponding to each of the position indicating lights, each of the platform positioning switches configured to rotate the rotating means to position a corresponding one of the bins under a corresponding one of the first openings.

5. The waste compactor of claim 4, further comprising a compactor operation switch corresponding to each of the position indicating lights, each of the compactor operation switches configured to rotate the rotating means to position a corresponding one of the bins under the compacting means and to operate the compacting means.

* * * * *